United States Patent [19]

Hartmann et al.

[11] Patent Number: 4,864,406
[45] Date of Patent: Sep. 5, 1989

[54] TELEVISION RECEIVER WITH A SYNCHRONIZED EXTERNAL-POWER STAGE

[75] Inventors: Uwe Hartmann, Villingen-Schwenningen; Udo Mai, Villingen, both of Fed. Rep. of Germany

[73] Assignee: Deutsche Thomson-Brandt GmbH, Villingen, Fed. Rep. of Germany

[21] Appl. No.: 244,705

[22] Filed: Sep. 15, 1988

[30] Foreign Application Priority Data

Sep. 19, 1987 [DE] Fed. Rep. of Germany ....... 3731568

[51] Int. Cl.$^4$ ............................................. H04N 5/63
[52] U.S. Cl. ................................. 358/194.1; 358/190; 315/411
[58] Field of Search .................. 358/190, 194.1; 315/8, 315/411

[56] References Cited

U.S. PATENT DOCUMENTS

| | | | |
|---|---|---|---|
| 4,500,923 | 2/1985 | Duvall et al. .................. | 315/411 X |
| 4,641,064 | 2/1987 | Testin et al. ........................ | 315/411 |
| 4,651,214 | 3/1987 | Rodriguez-Cavazos .... | 358/194.1 X |
| 4,761,723 | 8/1988 | Lendaro .......................... | 358/190 X |

Primary Examiner—James J. Groody
Assistant Examiner—Mark R. Powell
Attorney, Agent, or Firm—Max Fogiel

[57] ABSTRACT

An arrangement in a television receiver in which a sychronized external power stage supplies operating voltage to a remote-control receiver and a microprocessor connected thereto. A horizontal drive circuit is controlled by the microprocessor, and a horizontal end stage is connected to the horizontal drive circuit. The external power stage supplies power during stand-by operation only to the remote-control receiver and microprocessor along with the voltage for operating the horizontal drive circuit and the end stage. Thyristors are connected to the external power stage for supplying power to all other circuit stages in the television receiver. The thyristors have gate electrodes activated by the horizontal end stage for cutting off the thyristors during the stand-by operation and interrupting the supply of power to all other circuit stages in the television receiver, for minimizing the power consumption of the television receiver.

2 Claims, 1 Drawing Sheet

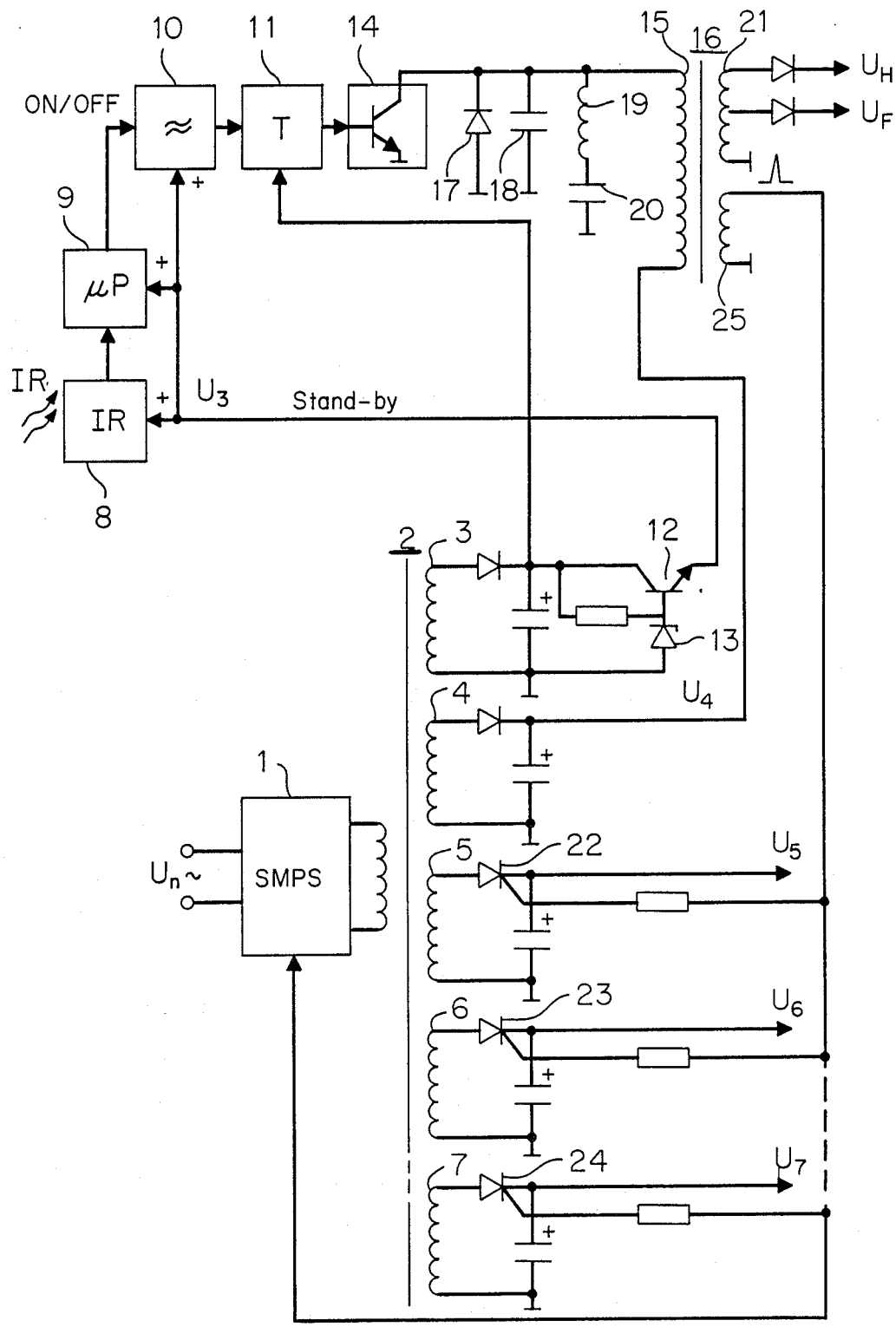

TELEVISION RECEIVER WITH A SYNCHRONIZED EXTERNAL-POWER STAGE

The invention concerns a television receiver with a synchronized external-power stage and a circuit that activates the horizontal end stage and that can be turned on and off by a remote control, whereby, during stand-by operation, the external-power stage only supplies power for the remote-control receiver and processor along with the voltage for operating the horizontal driver and end stage.

Present-day television receivers have external-power stages that also operate in the stand-by mode, when all of the stages that consume power are turned off. Only the remote-control receiver for receiving remote-control signals is in a ready state, along with the processing circuit, a microprocessor for example, that is connected thereto.

The object of the present invention is to further reduce the expense of a stand-by circuit in equipment of this type. The object is attained by the invention recited in the claim.

One embodiment of the invention will now be described with reference to the drawing.

The FIGURE illustrates only those components of a television receiver that are essential to the invention. The illustrated embodiment is a line-synchronized external-power stage 1 that generates voltages (U3–U7) for operating the various stages of the television receiver over an external-power stage transformer 2 to secondary windings 3, 4, 5, 6 and 7. To keep the television receiver in a ready state (stand-by), the voltage U3 for operating remote-control receiver 8 and microprocessor 9 and for a horizontal oscillator 10 and a horizontal-drive circuit 11 is made available over the winding 3 of the external-power stage transformer 2 in external-power stage 1, which is initially synchronized with the frequency of the external-power alternating-current voltage UN. This voltage is conventionally stabilized by a longitudinal regulator 12 and a zener diode 13. When microprocessor 9 forwards an ON command from remote-control receiver 8, horizontal oscillator 10 is activated. The horizontal-drive circuit 11 connected thereto activates a horizontal end stage 14 that is supplied with a secondary voltage U4 from the secondary winding 4 of switching-network stage transformer 2 that arrives at horizontal end stage 14 through the primary winding 15 of a line transformer 16. The line-deflection circuitry also contains a flyback diode 17, a flyback capacitor 18, a deflection coil 19, and a tangential capacitor 20. The function of the secondary winding 21 in line transformer 16 is to generate an high voltage UH and a focusing voltage UF. All the other power consumers in the equipment are supplied through secondary windings 5 and 6 and if necessary through further windings 7. Instead of a rectifier, a thyristor 22, 23, and if necessary 24 is connected to each secondary winding 5, 6, and 7 in switching-network stage transformer 2. The thyristors are activated by the line-frequency pulses of a secondary winding 25 in line transformer 16. The invention exploits the situation that no pulses for activating horizontal-drive circuit 11 occur during stand-by operation. Thus, there are also no pulses generated at winding 25 to activate thyristors 22, 23, and 24 and no operating voltages U1–U3 can occur. Only when the receiver is turned on and horizontal end stage 14 begins to function are the thyristors engaged.

Instead of the illustrated thyristors, other electronic switches with the same function are conceivable to forward rectified operating voltages through during normal operation.

We claim:

1. A television receiver comprising: a synchronized external power stage; a horizontal end stage and a circuit for activating said horizontal and stage; means for switching on and off said activating circuit by remote control; a remote-control receiver operated with voltage from said external power stage; a microprocessor connected to said remote-control receiver and supplied also with said voltage from said external power stage; a horizontal drive circuit controlled by said microprocessor, and a horizontal end stage connected to said horizontal drive circuit; said external power stage supplying power during stand-by operation only to said remote-control receiver and microprocessor along with said voltage for operating said horizontal drive circuit and said end stage; and thyristor means connected to said external power stage for supplying power to all other circuit stages in said television receiver; said thyristor means having gate electrode means activated by said horizontal end stage for cutting off said thyristor means during said stand-by operation and interrupting the supplying of power to said all other circuit stages in said television receiver for reducing power consumption of said television receiver.

2. A television receiver comprising: a synchronized external power stage; a horizontal end stage and a circuit for activating said horizontal end stage; means for switching on and off said activating circuit by remote control; a remote-control receiver operated with voltage from said external power stage; a microprocessor connected to said remote-control receiver and supplied also with said voltage from said external power stage; a horizontal drive circuit controlled by said microprocessor, and a horizontal end stage connected to said horizontal drive circuit; said external power stage supplying power during stand-by operation only to said remote-control receiver and microprocessor along with said voltage for operating said horizontal drive circuit and said end stage; and thyristor means connected to said external power stage for supplying power to all other circuit stages in said television receiver; said thyristor means having gate electrode means activated by said horizontal end stage for cutting off said thyristor means during said stand-by operation and interrupting the supplying of power to said all other circuit stages in said television receiver for reducing power consumption of said television receiver; an external power stage transformer with primary connected to said external power stage, said external power stage transformer having a plurality of secondary windings; said voltage for operating said remote-control receiver being supplied by one of said secondary windings, said external power stage being initially synchronized with frequency of an external power alternating-current voltage; a longitudinal regulator and a zener diode for stabilizing said alternating-current voltage; a horizontal oscillator connected between said microprocessor and said horizontal drive circuit and being activated by said microprocessor; said horizontal end stage being activated by said horizontal drive circuit and being supplied with voltage from another one of said secondary windings; a line transformer with primary winding connected between said horizontal end stage and said other secondary winding; said line transformer having a secondary winding for generating a high voltage and a focusing voltage; said thyristor means comprising a plurality of thyristors connected to the remaining ones of said secondary windings; said thyristors being activated by line-frequency pulses of a secondary winding in said line transformer; pulses for activating said horizontal drive circuit being absent during stand-by operation; said thyristors conducting only when said television receiver is turned on and said horizontal end stage commences to function.

* * * * *